(12) United States Patent
Emerson

(10) Patent No.: US 12,137,134 B2
(45) Date of Patent: *Nov. 5, 2024

(54) INTERNET STREAMING OF DYNAMIC CONTENT FROM A FILE

(71) Applicant: Harry E. Emerson, Seven Hills, OH (US)

(72) Inventor: Harry E. Emerson, Seven Hills, OH (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/137,918

(22) Filed: Dec. 30, 2020

(65) Prior Publication Data

US 2021/0203708 A1  Jul. 1, 2021

Related U.S. Application Data

(60) Continuation of application No. 14/968,834, filed on Dec. 14, 2015, now Pat. No. 10,887,364, which is a
(Continued)

(51) Int. Cl.
| | |
|---|---|
| *H04L 65/70* | (2022.01) |
| *G06F 9/52* | (2006.01) |
| *H04L 9/40* | (2022.01) |
| *H04L 51/046* | (2022.01) |
| *H04L 65/401* | (2022.01) |

(Continued)

(52) U.S. Cl.
CPC .............. *H04L 65/70* (2022.05); *G06F 9/526* (2013.01); *H04L 51/046* (2013.01); *H04L 63/14* (2013.01); *H04L 65/4015* (2013.01); *H04L 65/403* (2013.01); *H04L 65/60* (2013.01); *H04L 65/61* (2022.05); *H04L 65/611* (2022.05); *H04L 65/762* (2022.05); *H04L 65/764* (2022.05); *H04L 67/02* (2013.01); *H04L 67/10* (2013.01); *H04N 21/21* (2013.01); *H04N 21/4622* (2013.01); *H04N 21/472* (2013.01); *H04N 21/812* (2013.01)

(58) Field of Classification Search
CPC .. H04L 65/4069; H04L 65/604; H04L 65/607
See application file for complete search history.

(56) References Cited

U.S. PATENT DOCUMENTS

| | | | | |
|---|---|---|---|---|
| 6,535,920 | B1 * | 3/2003 | Parry ................... | H04N 9/8205 386/E9.036 |
| 8,880,723 | B1 * | 11/2014 | Emerson, III .......... | H04L 63/14 709/221 |

(Continued)

*Primary Examiner* — Barbara B Anyan

(57) ABSTRACT

Internet broadcast media streaming is described wherein triggers from internal or external systems for controlling audience media players cause an encoder system to generate command messages. Command messages are encoded into a composite output time-synchronous with the broadcast media. The composite output is written to a file or delivered to a streaming media distribution system configured to write the received composite media stream to a file for access by client media players. The command messages cause the media players to obtain or present dynamic content in association with the broadcast streaming media, and to cause any desired configuration changes to the appearance of the media player or the method or manner in which the dynamic content is presented.

20 Claims, 9 Drawing Sheets

Related U.S. Application Data division of application No. 13/918,932, filed on Jun. 15, 2013, now Pat. No. 9,215,259, which is a continuation of application No. 13/685,460, filed on Nov. 26, 2012, now Pat. No. 9,270,718.

(60) Provisional application No. 61/629,689, filed on Nov. 25, 2011, provisional application No. 61/629,690, filed on Nov. 25, 2011, provisional application No. 61/629,692, filed on Nov. 25, 2011.

(51) Int. Cl.
*H04L 65/403* (2022.01)
*H04L 65/60* (2022.01)
*H04L 65/61* (2022.01)
*H04L 65/611* (2022.01)
*H04L 65/75* (2022.01)
*H04L 67/02* (2022.01)
*H04L 67/10* (2022.01)
*H04N 21/21* (2011.01)
*H04N 21/462* (2011.01)
*H04N 21/472* (2011.01)
*H04N 21/81* (2011.01)

(56) References Cited

U.S. PATENT DOCUMENTS

| | | | |
|---|---|---|---|
| 2010/0005501 A1* | 1/2010 | Stokking | G10H 1/365 725/115 |
| 2010/0081116 A1* | 4/2010 | Barasch | A63B 24/0003 434/308 |
| 2010/0174783 A1* | 7/2010 | Zarom | H04L 65/403 709/205 |
| 2011/0022471 A1* | 1/2011 | Brueck | G06Q 30/0264 709/217 |
| 2011/0296474 A1* | 12/2011 | Babic | H04N 21/21 725/87 |
| 2012/0196571 A1* | 8/2012 | Grkov | G06F 21/88 455/411 |
| 2014/0149596 A1* | 5/2014 | Emerson, III | H04L 51/046 709/231 |

\* cited by examiner

INTERNET STREAMING OF DYNAMIC CONTENT FROM A FILE

CROSS REFERENCE TO RELATED APPLICATIONS

This application is a continuation of U.S. application Ser. No. 14/968,834 filed Dec. 14, 2015, to issue on Jan. 5, 2021 as U.S. Pat. No. 10,887,364, which is a continuation of U.S. Pat. No. 9,215,259 filed Jun. 15, 2013 as U.S. application Ser. No. 13/918,932, which was a divisional of U.S. Pat. No. 9,270,718 filed Nov. 26, 2012 as U.S. application Ser. No. 13/685,460 which claims the benefit of priority under 35 U.S.C § 119(e) of U.S. Provisional Application No. 61/629,689, U.S. Provisional Application No. 61/629,690, and U.S. Provisional Application No. 61/629,692, all filed Nov. 25, 2011, the entire disclosure of all of which are incorporated herein by reference.

BACKGROUND OF THE INVENTION

1. Field of the Invention

Disclosed are arrangements related to the delivery of broadcast radio or television on the Internet with the associated ability to replace portions of the broadcast content with alternative content for the Internet audience, and to dynamically present audio and video content on the audience media players under the control of a radio or TV station personality.

2. Description of the Prior Art

For convenience of discussion, this document will use the term "radio" with the understanding that the embodiments described herein apply to both radio and television. In the radio broadcast industry, the over-the-air broadcast is referred to as a "terrestrial" broadcast, differentiating from satellite and Internet broadcasts. The delivery of a terrestrial broadcast on the Internet is commonly referred to as webcasting, simulcasting, or streaming.

In a radio broadcast environment the radio stations use broadcast automation systems, which are computer based products that manage their playlists and jingles and provide timing for DJ chat, and play music, recorded audio programs, commercials, and associated material.

In a conventional streaming configuration, there will be a computer running a specialized type of software referred to as an encoder at the radio broadcaster's location. That encoder receives audio from the radio station's audio chain, and receives metadata from the radio station's automation system in association with the audio stream to identify content elements. Content elements can include data such as the artist and title of the music that is playing, the duration of the song, identifying if the content element is an advertisement, identifying if that advertisement is eligible to be or must be replaced with alternate content for the Internet stream, and identifying other types of content such as radio station jingles and sweepers and the like. The encoder typically receives analog audio from the conventional audio source, which is converted by the system sound card into PCM format of digital audio, and the encoder then converts that PCM audio into a final digital stream format using whatever codec has been selected for the process. Some common formats include MP3 and WMA.

Most radio station webcasting environments are three-tier architecture, with the encoder residing at the broadcaster's location, one or more servers residing at a centralized location serving as the mass distribution point to Internet clients, and a multiplicity of client computers or devices which connect to the stream at the mass distribution point. The encoder receives the station's audio stream in analog format, encodes it into an appropriate digital format, transmits the encoded audio to the centralized server, and the centralized server than redistributes that encoded audio to the clients. User devices connect to the centralized server because the link on the station's web page points to the centralized server.

The centralized servers also may perform functions beyond redistributing media data to client devices, such as the provision of web services. These operations and functions may be split amongst multiple servers. For simplicity, though, we may conveniently refer to all these operations as "the media server", or "the distribution server".

For purposes of this discussion the terms client and client device or client system generally refer to a software system which most commonly comprises a web page incorporating a media player object along with customized software to manage the media player object such as providing buttons for Stop, Start, etc. A media player object is a software structure that gets incorporated into the web page and performs the decoding and playing of audio and visual content. Media players can also be desktop applications such as WinAmp and the Windows Media Player, and they can be software applications incorporated into hardware appliances such as Internet radios, which are physical devices having Internet connectivity, and can connect to streaming media and play that content.

In order for content replacement to be acceptable to listeners the replacement needs to be seamless. That means there should be no audible or visual glitches such as snippets of the content to be replaced bleeding through into the Internet content nor should there be Internet content running on over the beginning of the next content element, etc.

There are delays of a relatively unpredictable nature that are introduced throughout this three-tier architecture. For example, the encoder introduces a delay in the process of converting the audio into the desired codec format, there may be a small but perhaps not negligible delay in the transmission of the data from the encoder to the centralized servers, there will be a buffering delay at the servers, there may be other delays in the network transmission from the centralized server location to the end-user client, and if the client's network connection is slow or of poor quality that delay may be noticeable, and lastly the client itself will introduce a buffering delay. However, most listeners will be unaware that there is any delay at all of the Internet stream compared to the terrestrial broadcast—one of the few ways a user might discover this is if the radio station announces the time and the user simultaneously checks a clock.

There are advantages to being able to customize a stream for each listener, particularly by performing ad replacements wherein the replacement ads are selected for each user or demographic group of users. We had solved this problem some years ago, as described in our U.S. Pat. No. 7,490,053, using a model wherein the replacements and insertions take place at the centralized server location, and a new single composite stream containing the replacement content is created uniquely for each client, and then distributed to those clients.

There also are arrangements for ad replacement at the client device; TargetSpot is an ad delivery vendor whose system provides for demographically targeted audio ads that replace in-stream audio ads at the client. In the TargetSpot system, a TargetSpot Flash Media Player object is embedded in the client's media player webpage. The streaming vendor (such as SurferNETWORK), is responsible for providing the appropriate software at the encoder, at the centralized server, and in the client media player web page in order to call the TargetSpot Flash player with the appropriate instruction at the appropriate time. In essence, the TargetSpot system says "I'll play an ad whenever you tell me to, but you have to figure how to do that". If you tell TargetSpot to play an ad at the wrong time, it will. If you don't tell it to play an ad at all, it won't play anything.

SUMMARY OF THE INVENTION

There are other opportunities if the replacements and insertions could take place at the client device, and that technology has not existed until now. For example, the technology described herein enables the replacement of a radio station's audio content, such as audio ads, with video content, such as video ads. Continuing the comparison with TargetSpot, there is no capability to command the TargetSpot object to replace an audio ad with a specific ad, nor is there a capability to command it to replace an audio ad with a video ad, and if TargetSpot were to play a video ad, there is no capability to cause the player to display that video in any particular fashion. These shortcomings are addressed in one embodiment as disclosed herein.

The following environments, systems, software, and technology may be provided by a streaming service (webcasting service, or hosting service) on behalf of radio and television broadcasters and other Internet streaming media providers.

The "encoding computer" or "encoding software" may include a variety of specialized software routines beyond just those needed to encode audio into a particular audio format. For example, there may be routines for obtaining a list of commercials from a remote server, for obtaining the commercials themselves (the media data), for processing metadata received from the broadcast automation system, as well as other necessary functions including content replacement and management of a delay buffer for that purpose, and the creation and transmission of command messages to control actions of the client device media players. But for convenience, we refer to this as the "encoder" or "encoder suite" or "encoding computer".

The architecture described herein incorporates the creation or utilization of a control channel for transmitting metadata or command messages from the radio station encoder all the way through to the client device. That capability exists commercially: for example, Microsoft offers a feature they referred to as "script commands", and Adobe, through their Flash Media Encoder, and Flash Media Server, offers a similar capability that they referred to as cue points. In the case of the Microsoft products, script commands can be inserted programmatically into a Windows Media Encoder as it is encoding audio or video; those script commands are transmitted to a publishing point on the centralized distribution servers running Microsoft's Windows Media Service; Windows Media Players or player objects (or compatible) connect to the publishing point, which relays the script commands to the Windows Media Players in association with the media stream. Software associated with the player objects can receive an announcement every time a script command is received; for webpage-based media players, software in the web page can respond to a script command in any desired fashion.

The client devices have media player software with one or more media player objects, and may incorporate additional logic to receive and process commands from the encoder, and may communicate with a centralized server for additional data and instructions using programming techniques such as AJAX calls.

In addition to previously mentioned delays related to streaming, the content insertion process introduces delays to accommodate the fact that the elements to be inserted may not be of the precise duration of the element to be deleted. For example, a local commercial of 29 seconds duration might be replaced with a commercial of 30 seconds duration. Or, a commercial of 30 seconds might be replaced with a commercial of 60 seconds, or a commercial 60 seconds might be replaced with a commercial of 15 seconds. We have developed such a technology, which we refer to as "rubber-banding". The rubber-banding process essentially runs the received audio at the encoder through a software delay filter (delay buffer) where the actual insertion takes place. If a 15 second commercial were replaced with a 60 second commercial, the last 45 seconds of the 60 second commercial needs to be stored in a buffer to play out at the appropriate time. Also, once such a delay is introduced, all subsequent audio received from the station needs to be delayed by the same amount. Consequently, if 15 second commercials were replaced with 60 second commercials repeatedly, a large buffering delay would build up within this delay filter. As a result, the audio stream and associated metadata that ultimately is delivered to each client will also be delayed by an unpredictable amount. The rubber-banding process will monitor the amount of data in the delay buffer, and when a threshold is exceeded it will shorten the delay by dropping the insertion of an ad. The delay in the buffer will then be shortened by the duration of the ad that was dropped. This is a somewhat simplistic explanation of rubber-banding, but the essential fact is that it is a necessary process for content replacement in order to be sufficiently flexible so as to be useful, and it introduces a variable and unpredictable delay into the audio stream ultimately delivered to each of the clients.

Despite the variable delay that is introduced, the rubber-banding technology is nevertheless suitable for the replacement of one content element with another by the encoder, wherein the newly composited stream created by the encoder is transmitted to the centralized server, and then redistributed to all clients. In this model all clients receive exactly the same stream, meaning that if a local ad, for example for an automobile dealer, is replaced with another ad, for example for a credit card, then all Internet listeners receive the ad for the credit card whether or not they are within radio reception range of the station. The variable delays that have been introduced are irrelevant. The Internet clients receive a continuous stream, and the client software has no awareness of the fact that the stream content is somehow different from the terrestrial content.

Overall, described herein are arrangements for streamed media from sources such as broadcast radio and television to use an encoder suite to send command messages to client devices, wherein the command messages are synchronized with the original audio (or video) through a delay buffer such that the command messages are received by the client devices at the precise time of the audio or video event, such as in the case of the replacement of an ad. Described is an arrangement to provide for content replacement at the encoder as well as the synchronization of metadata associated with that content at the encoder, and combining that with content replacement at the client. In addition, the command messages serve as general purpose, real-time instructions to the media players to cause them to configure themselves to change from one media source to another or to play a second media source simultaneously with the first, or to obtain other text, audio, or visual content, and to configure the display of that media and other content elements of the media player.

In order to provide command messages and metadata associated with the station's audio, such as the artist and title of a song, command messages and metadata are also introduced into the delay filter, and march through the delay filter with the progression of the clock, so that they are output from the delay filter synchronously with the associated audio element.

In this fashion, general purpose dynamic and real-time control of remote web-based media players is achieved, such that a radio station DJ, announcer, or local or syndicated talk show host can cause all the connected media players to simultaneously be reconfigured and display or present or remove or stop the desired content. The net effect is that the presenter has dynamic control over web pages that have already been launched. No user action is required, users do not click on anything to cause, or allow, these dynamic changes, nor do the web pages, of which web-based media players are comprised, need to continually check a web server, such as by AJAX, to determine if action is required.

The circumstance triggering the actions of the encoder suite can be the receipt of metadata from the broadcast automation system, for example, receiving a code indicating that the station is playing a commercial. Triggering events could also be received from other systems, via mechanisms such as TCP, to indicate switching to an alternate media source, wherein that alternate media and associated command messages are synchronized through a delay buffer in a similar fashion. A DJ or Talk Show Host utilizing a web cam are examples of alternate media, and the triggering events could be TCP messages sent from the computer hosting the web cam, or from a web-based or application based control panel.

Wherever TCP is referenced herein, it refers to any available networking technology, such as UDP, IP, or Ethernet, that can be suitably arranged for the intended purpose.

Alternate media could be encoded simultaneously with the original media such that the two are mixed together. Or, the alternate media could be pre-encoded and delivered through the delay buffer with its associated messages and be synchronized in time with events, music, or voice in the original media. Or, the alternate media could be delivered to a hardware port of the encoding computer, such as a line-in port, or a video capture card, and be made available to the primary encoding software, or to another encoder of the same encoding suite of software. In these various scenarios, the original media could be sent to a primary publishing point on a centralized distribution server, the mixed media could be sent to the same publishing point, the alternate media could be sent to that same publishing point in lieu of the original media, or the alternate media could be sent to a second publishing point.

In scenarios wherein the alternate media is sent to a secondary publishing point, command messages from the encoder suite to the media players instruct the players to assign a media player object for this media, provide the URL or link to the secondary publishing point, provide appropriate instructions for the media player web page to configure itself for the presentation of the alternate media content, and provide the timing commands to start and stop the presentation of the alternate media.

Command messages can instruct media players to turn on or off specific media player objects, to open or make visible or hide or close windows on the media player web page, to move or resize those windows, to deliver media URLs or similar links to player objects to cause them to retrieve the content associated with those links and present that content at any portion of the web page or in any window or as audio only, and in general to execute any program such as a JavaScript module, or manipulate the HTML or JavaScript Document Object Model, or display control through CSS.

In addition, multiple stations that are not physically co-located can be linked together via a centralized server so that triggering events can originate from any one station, or from a location remote from any or all of the stations, and the audio or video media and metadata or command messages associated with the triggering source are delivered to the encoder suite of each participating station, and operated and synchronized through the buffer delay system individual to each, so that all such stations send the appropriate media and command messages to their Internet audience so that all media players of all such stations act uniformly, but with properly synchronized audio and video and other content.

The innovations described herein enable the delivery of metadata associated with songs and other content, such as the artist and song title, with precision timing so that the display of the artist and song title for the a new song occurs at the moment that new song begins playing. It enables the replacement of one type of content with another type, for example, to replace an audio ad with a video ad. Furthermore it enables the replacement of generic ads transmitted by the encoder with demographically targeted ads such that each listener might receive an ad customized for them. It also recognizes that the listener environment may well include listeners with devices and software systems that are incapable of performing this type of content replacement, and therefore it provides an arrangement such that a generic replacement ad will be delivered to all listener devices, and if an individual listener device is incapable of performing content replacement it will play the generic replacement ad and thus will deliver a continuous uninterrupted stream to the listener, and they will be unaware that some alternative content might have been played.

Recalling the discussion of rubber-banding, it is a software process sometimes referred to as a delay filter which is a software mechanism for snipping out particular content elements and replacing them with other content elements. Metadata associated with the content element is tied to the media data in the delay filter, so that the metadata is transmitted to the server complex and then to the client devices synchronously with the beginning of the associated content element. Regardless of how much delay might have been introduced, when a new song begins to play the artist and title information associated with that song is available to be displayed at the moment the song begins to play.

The above described architectural features enable the implementation of unique content replacement of broadcast radio and TV on the Internet. In addition, the technology enables other unique and valuable features including the dynamic presentation of A/V content in association with a streamed media program, and the ability for a radio personality to turn a web cam on or off and have the associated video feed dynamically appear or be removed from the media players of the audience. These and other features are described herein.

Other aspects and advantages of the disclosed embodiments will be apparent upon consideration of the drawings and detailed descriptions, which follow.

BRIEF DESCRIPTION OF THE DRAWINGS

The invention will be more fully understood when reference is had to the following detailed description of the embodiments and the accompanying drawings, in which.

DESCRIPTION OF THE PREFERRED EMBODIMENTS

What follows are detailed descriptions of exemplary embodiments, but the scope of the invention is defined by the claims that follow the detailed description, and is not limited to the disclosed embodiments.

Content Replacement

One embodiment comprises the ability to replace one element of content with another, for example, one audio ad may be replaced with another audio ad of the same or different duration. In this situation, content replacement is performed by the encoder.

Another embodiment comprises the ability to replace one type with content of another type, for example, the original content might be an audio stream in Windows Media Format (WMA), but the replacement might be a video. Further, a video might replace another video of a completely different format, for example WMV video might replace MP4 video, or an H. 264 video, or a Flash SWF video. In these situations, the encoder will cause the replacement to be performed at the media players.

Figure 1:
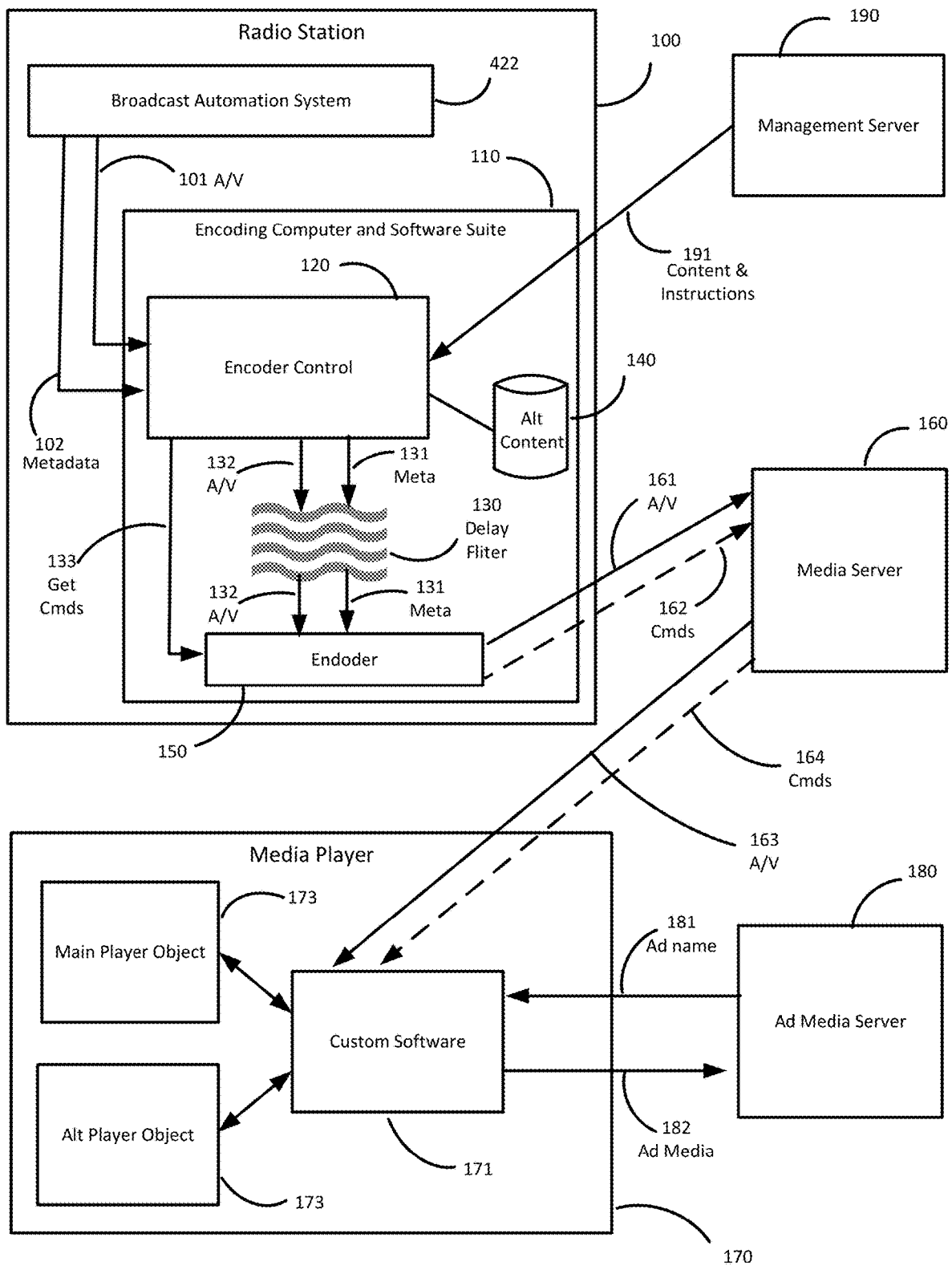
FIG. 1 is a schematic illustration of the content replacement embodiment showing the main component systems and primary subsystems.

Referring to FIG. 1, an encoding computer 110 is connected to a radio station's 100 audio chain 101 and to the metadata output of the radio station's broadcast automation system 102. The encoding software suite 110 incorporates a delay filter 130. The incoming audio is directed into the delay filter by the encoder control 120. Metadata in association with an audio event, such as the playing of a song or commercial, is received and processed. For some events, such as the playing of a song, the encoder control 120 may insert metadata such as the artist and title of the song into the delay filter 130 at the beginning of the audio for the song. When the audio for the beginning of the song 132 exits the delay filter and is sent to the stream encoder 150, the associated metadata 131 also exits and is sent to the stream encoder 150. At that time the encoder converts the metadata into a command message 162 and inserts it into the audio stream 161 as it is being encoded, for to the media server 160 for ultimate delivery to the media players 170 via composite A/V stream 163 which incorporates command messages 164.

For other events, the encoder control 120 inserts the replacement audio content from storage 140 into the delay filter 130 and thus creates a new composite stream 161, 162 which is delivered to all media players. The encoder control 120 may translate received metadata into command messages of a different type, and insert those command messages 131 into the delay filter 130 in synchronization with the associated replacement audio 132. Also the encoder may send a "Get Ready" command message 133 to the media players 170 via the encoder 150 as soon as the metadata is received from the automation system. For example, when one ad is replaced with another, the replacement ad may have an associated "companion" banner ad having a visual description of the audible ad. The "Get Ready" or pre-fetch command enables the media players to queue up that associated content.

Using the script command process identified previously, information about the content to be replaced at the player is delivered from the encoder 110 through the centralized server 160 and to the client device 170 by tying metadata associated with the content element to be replaced to the audio data in the delay filter, so that the metadata is transmitted to the server complex 160 and then to the client devices 170 synchronously with the beginning of the associated content element. However, for a replacement video, that process would be inadequate if the script command were sent out at the time the replacement content were to appear because there might be a gap of several seconds for a video ad to start playing while the video was retrieved from ad media server 180 and queued up. To solve that problem a pre-fetch script command (a "Get" command) is used as well as the play-now script command (a "Start" command) which is inserted into the delay filter in association with the beginning of the replacement audio content, each message command having an associated unique ID. Thus when the new composite stream is ready to be played out by the encoder and transmitted to the server complex it will simultaneously transmit the play-now script command. Once the encoder selects an ad or other alternative content for replacement at the player it sends a pre-fetch script command to the player. When the player receives a pre-fetch script command, it uses the URL or other suitable designator 181, which is also included in the ad list information and in script command, to fetch the replacement content 182 from ad media server 180 and load the actual media object into an available player object 173.

The client system 170 will receive the play-now script command at the exact moment when the replacement content (perhaps a video) is to begin playing, and software 171 in the client system 170 receives that play-now script command and in turn delivers a start playing command to the player object holding the preloaded video 173. Since the video is preloaded it begins the play immediately, and there is no discernible evidence to listeners or viewers that any replacement or interruption whatsoever has taken place. The replacement of content is perfectly seamless.

The encoder software suite 110 has software to respond to content replacement triggers. In one embodiment, metadata is received from a connected broadcast automation system 102. Software in the encoder suite 110 causes the encoder control 120 to replace the associated content with alternative content. The encoder maintains a listing or database 140 of available alternative content, which may be ads unique to the station, or national campaign ads, and so forth. The database 140 includes metadata about the ad such as the duration of the ad, format of the ad, the beginning and end dates of the campaign, the times of day for the ad to be run, and so forth. Periodically throughout the day the encoder is delivered an updated list 191 of available replacement content and a prioritization scheme from management server 190, along with replacement content media, so that the encoder suite 110 can optimize content replacement. For example it would preferentially choose the radio station's own ad rather than deliver a Public Service Announcement (PSA).

The ad list 191 delivered to the encoder is comprised of two basic types of information. The first is a listing of the generic replacement content that is to be delivered as "background" or "cover" to all player devices, and the second is a listing of replacement content to be replaced at the player device. For content to be replaced at the player, the ad list includes an identifier for the ad as well as the duration and media type information.

In playing videos as alternative replacement content there may be audio-oriented listener devices and systems incapable of playing that video content. To accommodate these devices the original content received at the encoder is replaced with "cover" or "background" audio content. For example a local audio ad to be replaced at the player with a video ad, is also replaced at the encoder with audio content such as a national audio ad or a PSA. This replacement content is delivered through the sequence of systems to the client device along with the associated metadata identifying the beginning of the content and other information associated with content, such as the duration. Those media players capable of playing the replacement video ad will do so, the others will simply play the station's audio stream, which at that moment will consist of the national audio ad or PSA.

Figure 2:
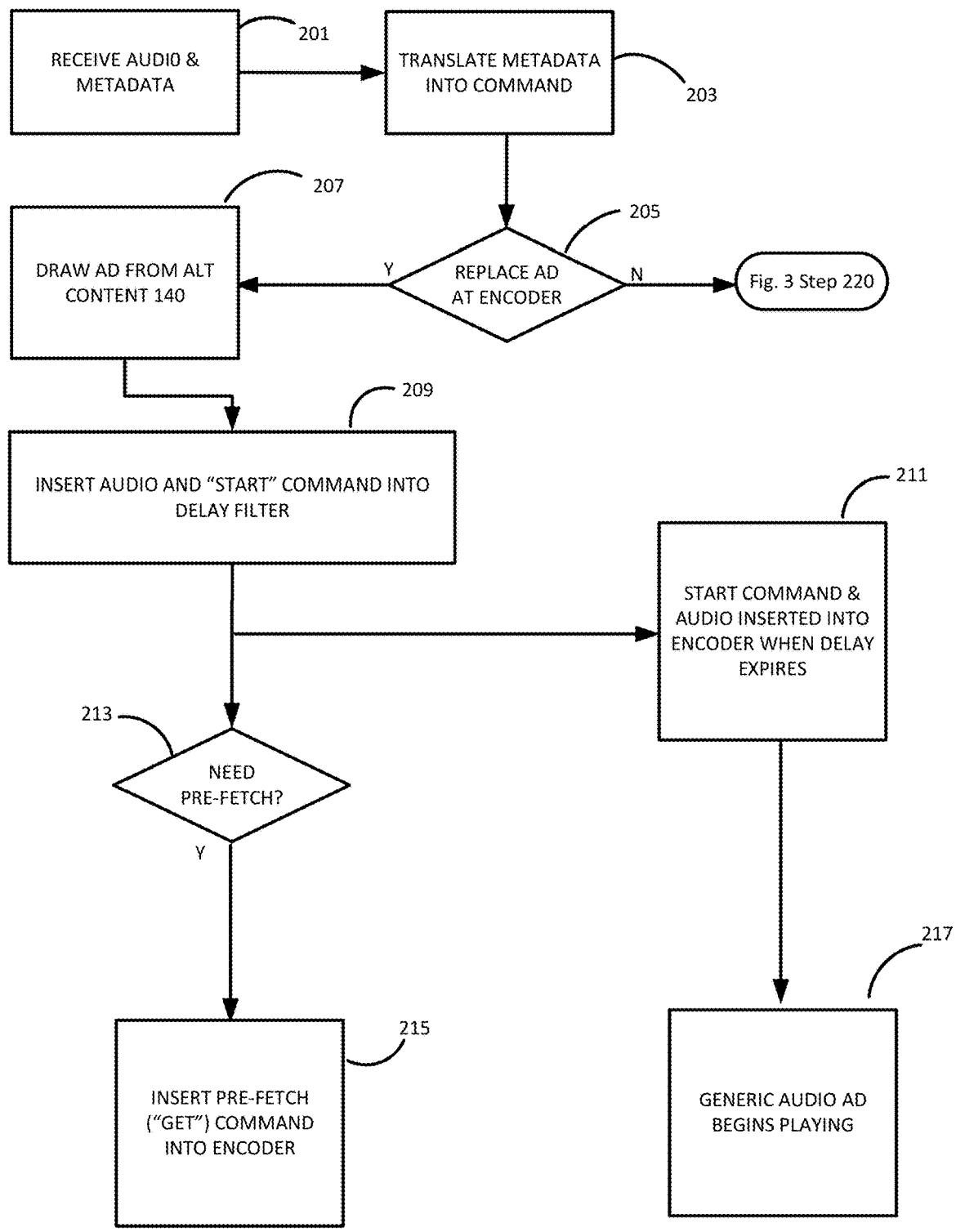
FIG. 2 is a flow chart of the encoder process when content replacement is to take place at the encoder.

Now referring to FIG. 2, for generic replacement content to take place at the encoder, audio and metadata are received at 201 by the encoder suite. Received metadata is translated to a command message, if possible, at 203. If an action indicated by the metadata and/or translated command message is to not replace content at the encoder at step 205, then the process stops, or, from a programming standpoint, the process moves to step 220 of FIG. 3. But continuing with FIG. 2, if content is to be replaced at the encoder in step 205, then an ad (or other content) at step 207 is drawn from the alternate content repository 140, and at step 209 the audio for the replacement content is inserted into the delay filter 130 along with a Start command, if one exists for this content replacement type. Following step 209, if the command or replacement type indicate to the encoder suite 110 that pre-fetch is required at step 213, then at step 215 a pre-fetch command for the content replacement is inserted into encoder 150 and is immediately transmitted to media server 160 and then to media players 170. Also following step 209, at step 211 the replacement audio and any associated Start command exit the delay filter 130 when the delay expires, and are inserted into encoder 150 wherein the audio is digitized and merged with the command message into a composite stream 161 that is sent to media server 160 and then to media player 170. At this time, at step 217, the generic replacement audio ad begins playing at the media player 170.

Figure 3:
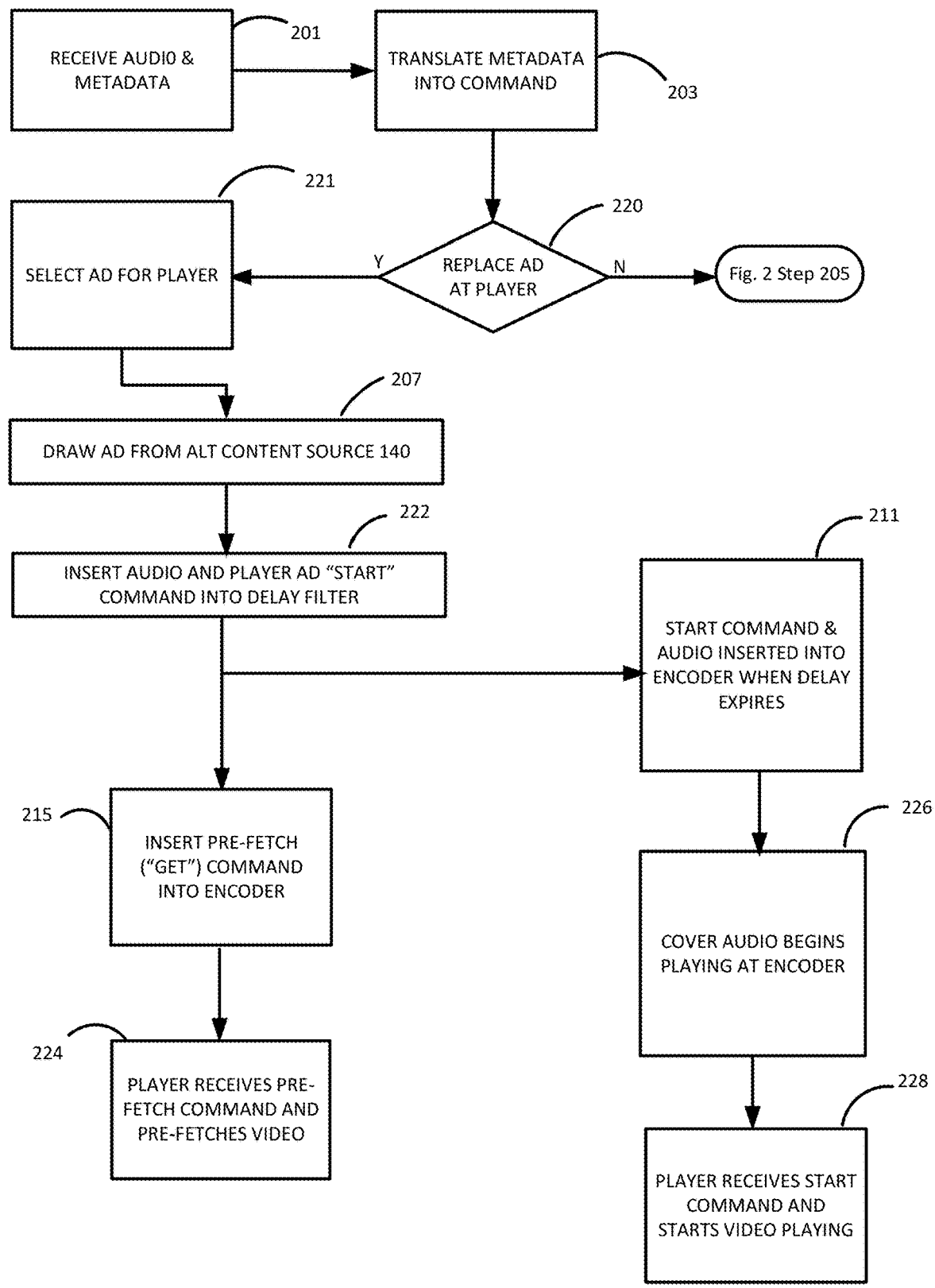
FIG. 3 is a flow chart of the encoder process when content replacement is to take place at the media player.

A similar process takes place for ad replacement at the player. Refer now to FIG. 3. Audio and metadata are received at 201 by the encoder suite. Received metadata is translated to a command message, if possible, at 203. If an action indicated by the metadata and/or translated command message is to not replace content at the player at step 220, then the process stops, or, from a programming standpoint, the process moves to step 205 of FIG. 2. But continuing with FIG. 3, if content is to be replaced at the player in step 220, then an ad for the player is selected at step 221 and an ad (or other content) at step 207 is drawn from the alternate content repository 140. At step 222 the audio for the replacement content is inserted into the delay filter 130 along with a Start command for the content replacement at the player. Following step 222, then at step 215 a pre-fetch command for the content replacement is inserted into encoder 150 and is immediately transmitted to media server 160 and then to media players 170. Then at step 224, the media player will pre-fetch the content indicated in the pre-fetch command message, and prepare the video player object 175 (assuming the replacement content is a video) to play the video.

Also following step 222, at step 211 the replacement audio and the associated Start command exit the delay filter 130 when the delay expires, and are inserted into encoder 150 wherein the cover audio is digitized and merged with the command message into a composite stream 161 that is sent to media server 160 and then to media player 170. At this time, at step 226, the background, or cover, replacement audio ad begins playing at the media player 170 for those media players not capable of playing the alternate video content. At step 228 content replacement at the player takes place such that the replacement video starts to play through alternate player object 173, and main media player object 172 is muted.

Figure 4:
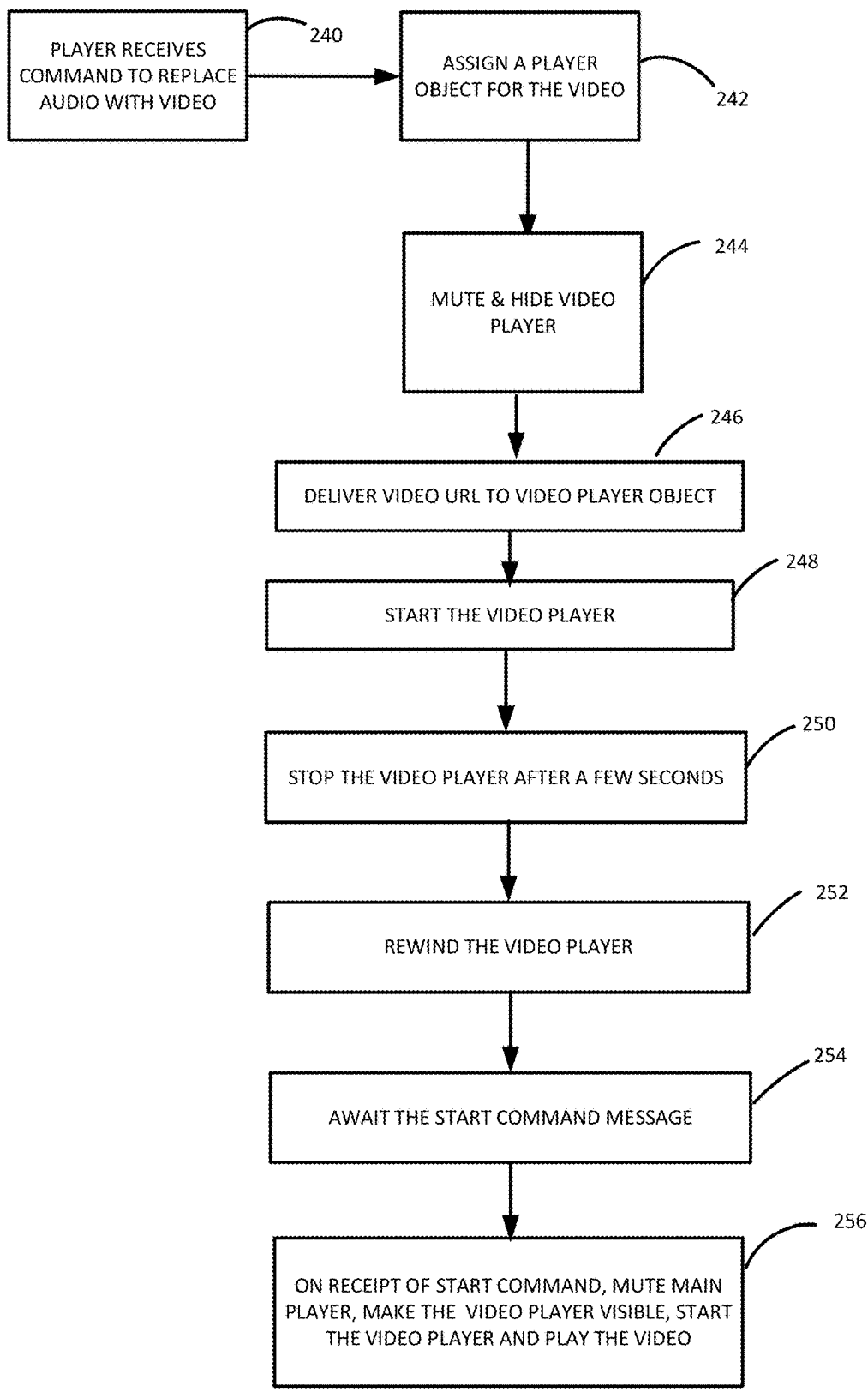
FIG. 4 is a flow chart of the media player process when content replacement is to take place at the media player.

Video replacement ads are replaced at the media players. Refer now to FIG. 4. At step 240, the media player 170 receives a command message 163 from media server 160 comprising instructions to replace the main audio stream with a video stream. Media player 170 assigns an available player object 173 for the video at step 242. Media player 170 mutes and hides or turns off the visual display of player object 173 at step 244, then at step 246 delivers the alternate content URL for the video to alternate player object 173. At step 248, the media player 170 starts the alternate player object 173, lets it run for a few seconds, and then stops it at step 250. The alternate player object 173 will have downloaded a significant portion of (and perhaps the entire) the replacement media object in those few seconds in which it was in play mode, considering that media players are currently designed for instant-on and fast start the player object 173 will attempt to download as much of the media as it can as fast as it can to fill its buffer. This achieves the objective of preloading the media so that it is instantly available when the start playing command arrives. During this process the player has run for nominally about 5 seconds, and as a result, when the start command is received, the player will continue to play from the point where it previously stopped −5 seconds into the content, rather than from the beginning. To solve this, a rewind command is delivered to the player object 173 at step 252 to reset it to the beginning of the media content. The media player 170 at step 254 then awaits receipt of the Start command message to play the video. When the player is given the Start command, it will play the queued up media from the beginning, and it will start immediately. At the moment the media player 170 receive the Start command at step 256, it mutes the media player object 172 of the main audio stream, makes the media player object of the video stream 173 visible, and starts it. When the video is finished, or at the end of the specified duration of the video, the media player stops the video player object, hides it, and unmutes the main audio stream media player object.

As yet another embodiment, different ads can be delivered to different listeners by a simple modification of the process described above. Assume that there is an ad delivery vendor with a large inventory of ads, and having information associated with those ads so that they might be preferentially selected based on the demographics or location of listeners or viewers. Also assume that the vendor has mechanisms using methods such as cookies to identify the types of sites that an individual might have visited, and other mechanisms such as are commonly employed in the Internet ad delivery business to determine or estimate user preferences and demographics. In the process described above, a database system selects ads for replacement at the client, and provides a list of these ads (or other content) to the encoder for delivery via the script command mechanism. For the delivery of ads customized to each user, included in that list is the appropriate information for the client system to draw an ad from the ad vendor. Essentially, instead of delivering a script command to each user containing the URL of the asset to be played, the script command contains instead the URL or ad tag information of the ad vendor. The ad vendor makes the selection of the ad to be delivered based on their mechanisms for assessing demographics, estimating or determining user preferences, determining the user's location, etc.

Alternatively, the webcasting service, utilizing the components, methods, and systems described in the various embodiments may also provide the function of an ad delivery vendor.

The encoder will use its list of replacement ads and prioritization criteria to select the replacements. The list may include audio ads to be delivered to all the audience, and it may include video ads which may not be playable by the entire audience. In this circumstance the encoder suite 110 of FIG. 1 will insert a "cover" audio ad. In one embodiment, cover ads are comprised of the audio portion of the video to be played. A process (not shown) extracts a copy of the audio track from video replacement content. The relationship of audio-track files to video files is stored in a management server 190. Management server 190 delivers the audio track and the relationship of audio track files to video files via the content and instructions connection 191 to the encoder control 120 for storage in the alternate content repository 140. When a video is selected as replacement content by the encoder control 120, it obtains the audio track associated with the video from repository 140 and inserts the audio track into the delay filter 130 along with the Start command message for the video, and inserts a pre-fetch Get command message via logical path 133 into the encoder 150 for immediate delivery to the media server 160 and the media player 170. Benefits of this arrangement include: one, the replacement cover content is exactly the same duration as the replacement video; and two, devices which cannot play the video will at least play the audio portion of the video, and thus the advertiser will benefit in that their message was at least partially delivered to those users.

In radio broadcasting terminology, breaks for commercials are referred to as spot breaks. Typically, spot breaks are two to six minutes, and may include a combination of ads of varying durations, from 15 seconds to 60 seconds. However, the availability and duration of replacement spots may be different. For example, the replacements may all be 60 seconds. Using the rubber-banding process, the encoder will insert one ad after another until the spot break is completed. If the spot break was 2 minutes 15 seconds, and the encoder inserted three 60 second ads, the delay in the buffer will be increased by 45 seconds. If this increase were to cause the delay to exceed a limit, the encoder will remove the $3^{rd}$ inserted ad and shrink the buffer, which will now be reduced by 60 seconds.

If the delay in the delay buffer has become too long due to inserting lengthy replacement ads in place of shorter ads, the encoder may drop one of the pre-selected ads, as described above. In this circumstance, the players have already received the "Get" command. Players would store the list of received Get commands in a standard programming structure such as an array. As Start commands are received and the replacement media is played, the associated Get commands are removed. However, Get commands for ads that have been dropped by the encoder will still be maintained by the player. To solve this, the player will periodically examine the list of Get commands and the time each command was received, and remove stale commands. Alternatively, the encoder will send a Cancel command with the ID of the Get command for the replacement ad that has been dropped. The player will then remove that Get command from its list.

The listing of replacement ads received by the encoder may also include the IDs or URLs of companion content to display in association with the replacement ads. These may be conventional banner advertisements. The Start and Get commands sent by the encoder to the players include such IDs or URLs of associated content, for retrieval and display by the media players.

In another embodiment, when a player receives a command message to play a video, it can be programmatically arranged to reconfigure itself so that the video is displayed in a particular region of the screen. A display region (typically, an HTML "div") may be created, sized appropriately, positioned where desired, hidden until needed, and made visible when the video starts. Overlays can be created to partially or fully hide other elements of the media player, and to serve as a backdrop for the video to create a more artistic presentation, and to help the user differentiate the video ad from other content that may be present on the player. As part of the ad list provided to the encoder, videos may have an associated companion content such as a banner ad, and the URL or other descriptive data of the banner ad is delivered to the player at the time the similar data for the video is delivered to the player. Just as the player can be dynamically configured to present the video ad, it can also be dynamically configured to present the associated banner ad. Thus, for a video to be presented without a companion banner, the player can be configured one way, and with a companion banner the player can be configured another way. At the same time, to optimize the entire media player while a video or other replacement content, or additional content, is played or shown, other display elements or regions can be resized, moved, hidden, shown, dimmed, highlighted.

Figure 5:
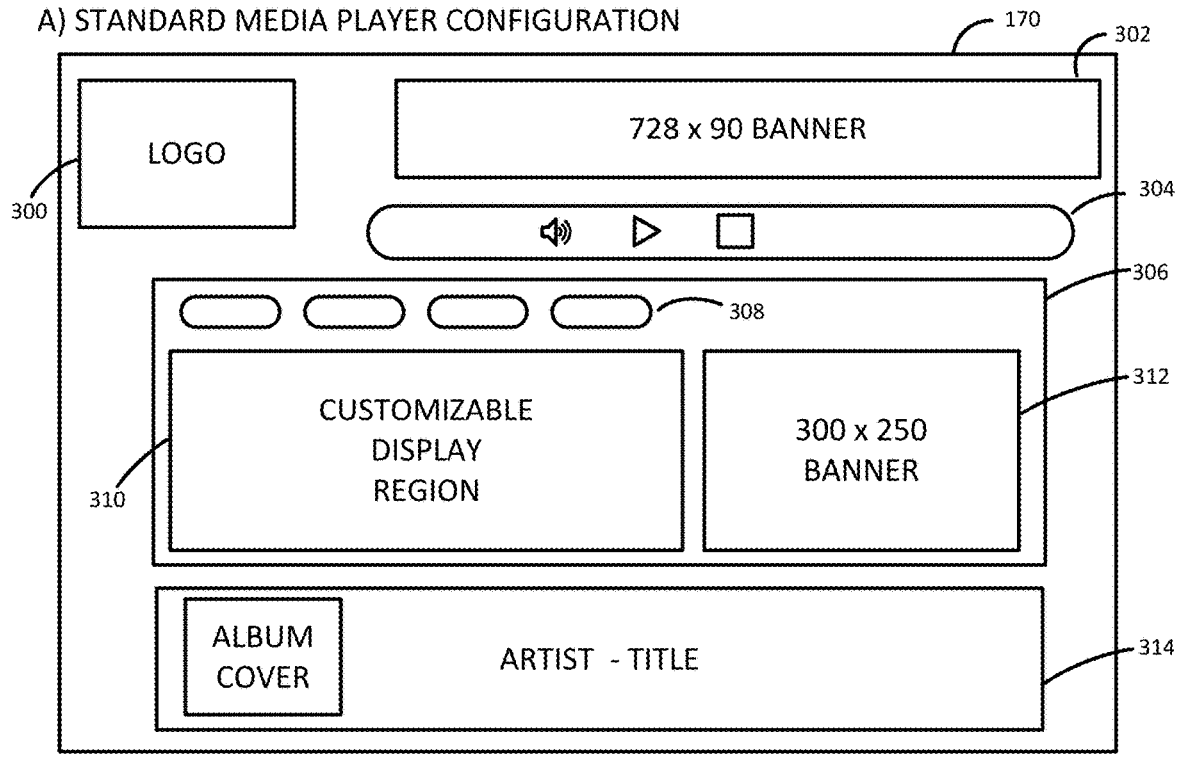
FIG. 5 is an illustration showing the dynamic reconfiguration or a media player as it changes from standard mode to a mode for playing a video ad.
Figure 5:
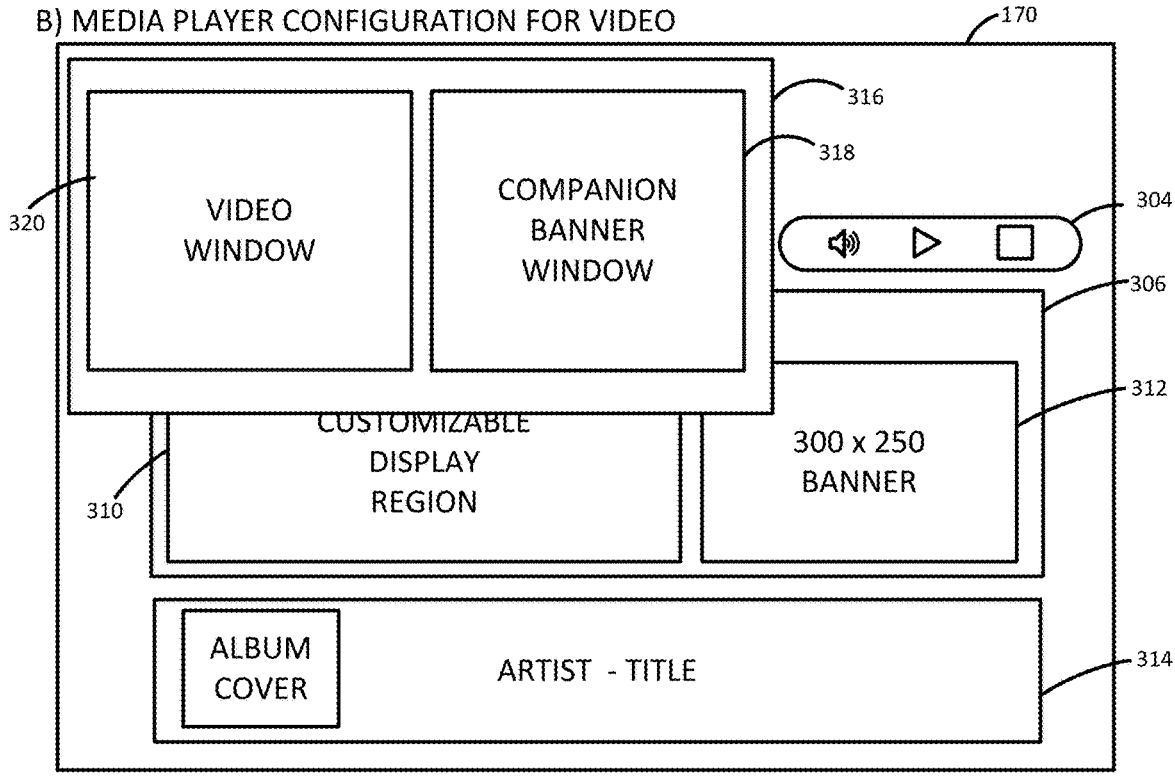

Referring now to FIG. 5, the top drawing A) illustrates the configuration of the media player 170 in its standard mode, and bottom drawing B) illustrates the same media player 170 as it is configured to play a video. The illustrated elements of A) are a radio station logo 300; a 728×90 banner ad 302; a control bar 304 having media player controls such as start, stop, and mute; a region 306 for radio station display purposes including selector buttons 308, a customizable display region 310, and a 300×250 banner 312; and a region 314 for the display of artist and title of the song currently playing.

When the player receives the command messages to play a video ad, the player morphs to configuration B), in which 728×90 banner 302 is removed, logo 300 is removed or hidden, control bar 304 is shrunken or replaced with a smaller version, and elements of region 306 are partially or completely overlaid by new elements comprising a translucent or opaque background 316 containing a video window 320 and a window 318 to display a companion banner for the video.

Dynamic Presentation of A/V Content:

A talk show host may wish to show a video clip about a topic they are discussing, or perhaps a financial news anchor may wish to show a stock market chart. A DJ may want to show photos from a local concert, the news announcer may want to show pictures of the accident that clogged the highway at rush hour. All of these are enabled by the following embodiment.

Figure 6:
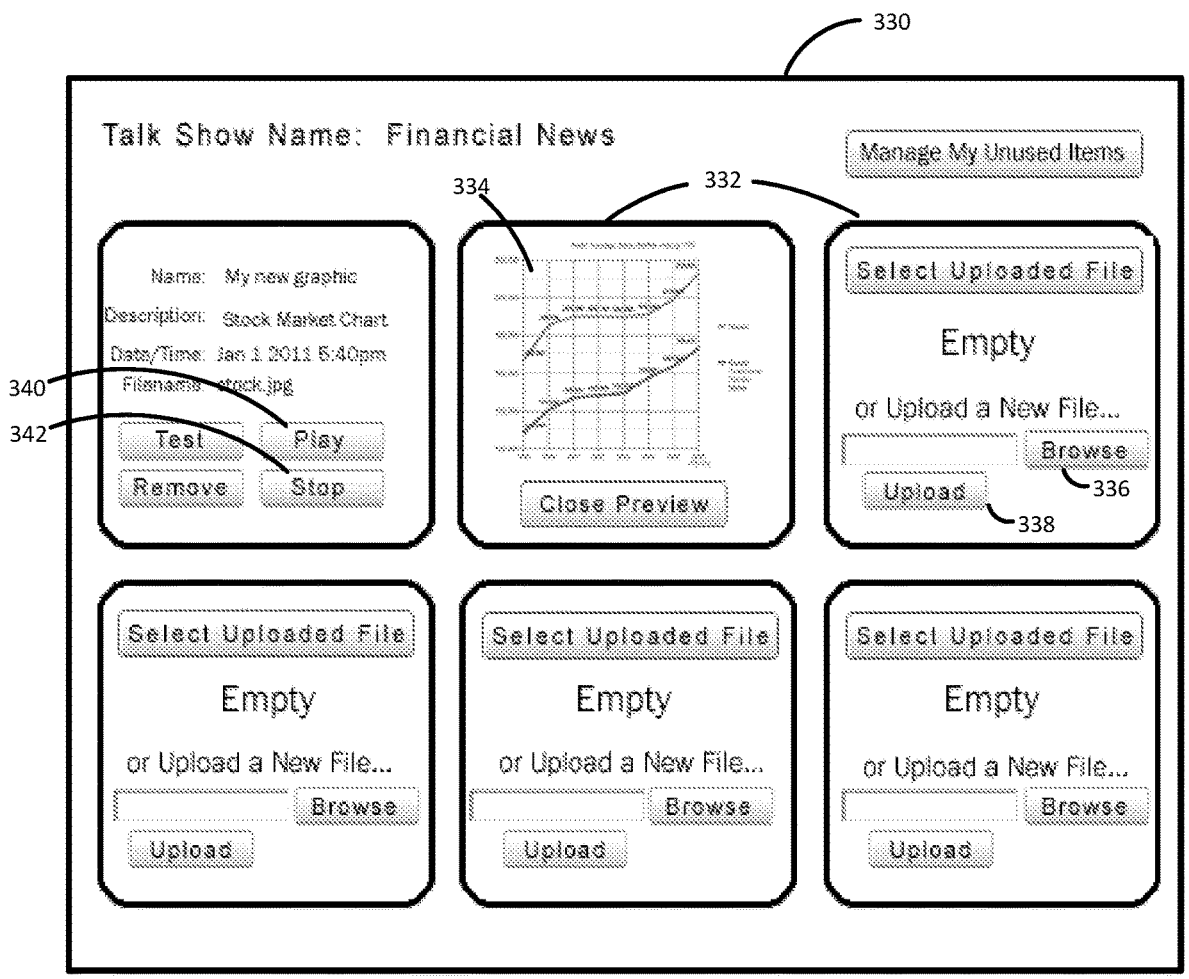
FIG. 6 is a stylized drawing of an Action page and its widgets.

A talk show host, or DJ, announcer, or producer can preset a number of content elements, including audio snips, video clips, still images, or text via a control panel web page or desktop application (an "Action" page) or similar facility as illustrated in FIG. 6, for later presentation on the media players 170 of the audience. In real time, the host clicking on any one of the preset content elements will cause that media item to appear and/or play in a window on the media players, and the appearance will be synchronized with the host's audio announcing the presentation of that item, so that the presentation to the audience will be transparent of buffering delays, and the audience's experience would appear the same as that of an observer in the studio.

Each radio station (or TV station) streaming on the Internet has a separate, unique, streaming link on their website which listeners (or viewers) click on to connect. This link most commonly connects to a distribution media server or server farm located in a datacenter on the Internet backbone. These links directly or indirectly connect to Publishing Points, or Mount Points on the distribution media servers. In the standard arrangement, a radio station has an encoding computer at the studio that encodes the station's audio and transmits it to the centralized distribution servers. Listeners are caused to connect to the distribution server in order to play the radio station content by clicking on the Listen link on the station's web page. The talk show host feature enables the talk show to deliver dynamic content to radio station listeners on the Internet in synchrony with the talk show audio for a single radio station, or for multiple radio stations, even though the streaming link is different for each station, and even though the buffering delays may vary considerably between such stations.

The control panel Action page, item 330 in FIG. 6, can hold an arbitrary number of "widgets" 332, where the widgets are small boxes or sections of the page, and each widget holds the representation of a unique content element as suggested by widget 334. Each widget can be loaded with a static image or video file or other content to be shown to the audience on command. Content can be selected 336 and uploaded 338, using conventional web controls. A producer uses the Action page to upload (or revise/delete) audio, image, or video files (content elements, or media files) to a central server file storage folder. Typically the central server will be a web server, although video content may be uploaded to a media server. Each box allows for the selection and upload of a specific media file and fields or buttons for functions such as:

a) a useful name,
b) a file name,
c) a description,
d) a date and time,
e) a browse button to locate the file,
f) a test "show it/play it" button for local display,
g) a close button for the test display,
h) an Upload button,
i) a "Show It/Play It" for the Audience button, and
j) a "Hide It/Stop It" button.

The media files are uploaded to and stored on the server in appropriate file folders or database tables. The meta-data regarding the media files [such as items a) through d) above] are similarly stored. When the producer opens the Action page, the boxes are populated with the meta-data from the server. The available action buttons then allow the producer to update, delete, or create new entries, or to view/play the contents of any widget.

When the talk show host clicks the "Play" or "Show" button 340 for any of these, a script command is generated by the Action page that ripples through the system and the delay filter in a similar fashion to the ad replacement system described herein, and is ultimately delivered to the audience media players which will fetch the desired content and present it in the intended viewing area. The particular path that the command messages will follow is dependent on the particular connectivity arrangement for that station or talk show.

Figure 7:
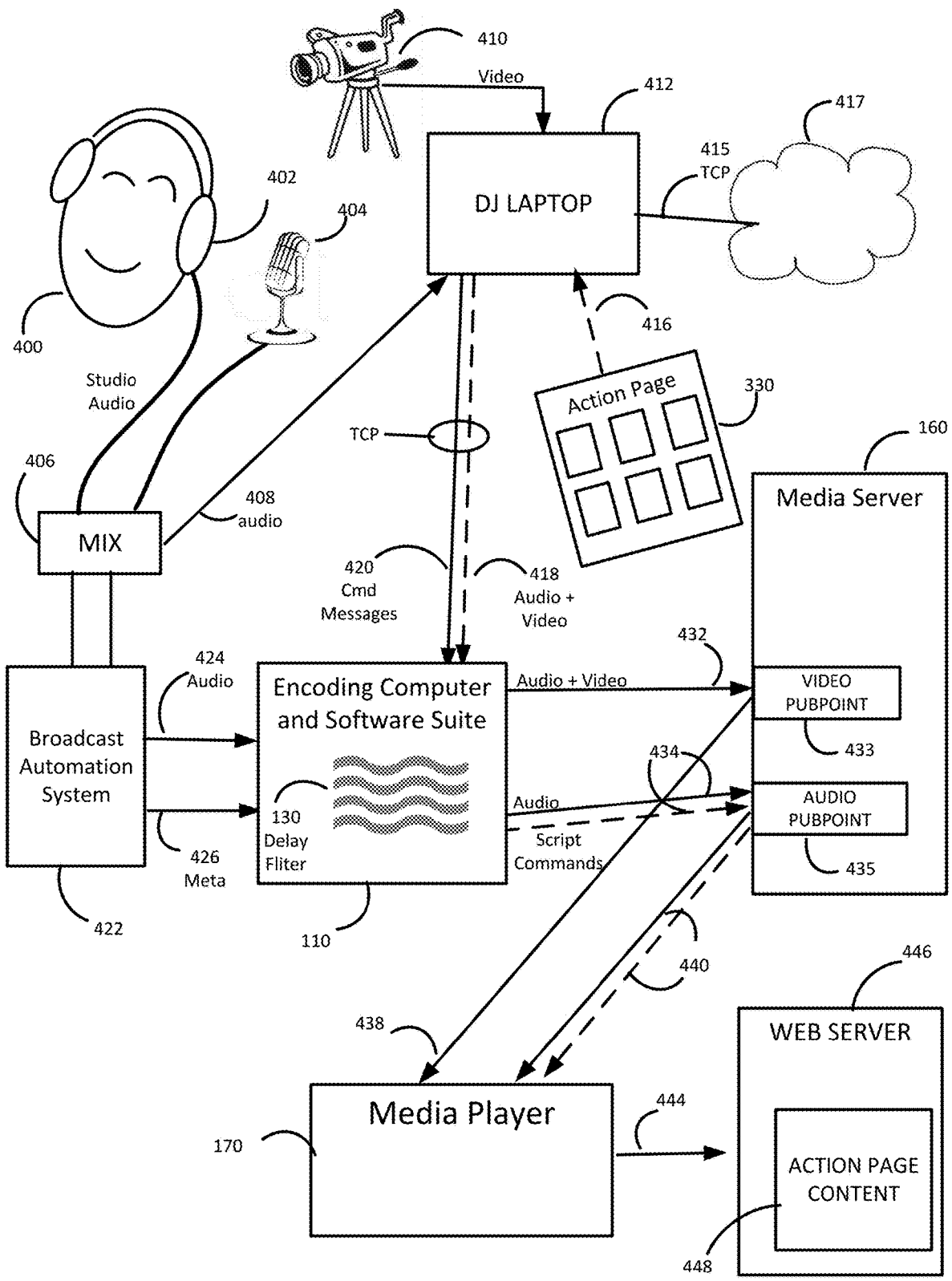
FIG. 7 is a schematic illustration of the system for the Pop-Up Web Cam and Dynamic Content for a DJ, announcer, or talk show host.

In a single station arrangement as illustrated in FIG. 7, the DJ or talk show host 400 would access the Action page 330 via a convenient computer, perhaps a laptop 412, and typically not the encoding computer which is usually located in an engineering room to be accessible to the station's audio feed. Action page 330 would typically be hosted by DJ laptop 412, but may be separated and connected to laptop 412 via data link 416. The Action page 330 has external network access 415 (shown as TCP connectivity to the Internet cloud 417) to the web server 446 which stores the Action page content 448 of media files and metadata information. The laptop 412, and hence the Action page 330, also has internal network access 418 to the encoding computer 110, which has software to communicate with the Action page. When a Play or Show button on the Action page 330 is activated, the Action page 330 and associated laptop 412 sends a command message 420 via TCP link 418 to the encoding computer 110, the command message containing the metadata of the media file (such as a URL) and the Action to be performed (such as Play or Stop). Optionally, the encoding software sends a Get command message for the desired action via connection 434 to the audio publishing point 435 of media server 160. Media server 160 relays this Get command message via the audio stream on Internet link 440 to the players 170.

As described previously with respect to the replacement of an audio ad with a video ad, when the player receives a Get command it assigns a player object to that purpose, if so required, and provides the URL to the media player object, and instructs the player object to pre-fetch the designated media element.

The encoding suite 110 also inserts an associated Start command message into the delay buffer 130 synchronized with the station audio being received at that moment. When the audio and the associated Start command message exit the delay buffer 130 the station audio and the Start command message are delivered to the audio encoder of encoder suite 110 which encodes the audio and inserts the command messages and transmits the composite signal via audio link 434 to audio publishing point 435 on media server 160. Media server, in turn, relays the command messages to any media players 170 connected to audio publishing point 435. Media player 170 receives the command message to display or present dynamic content, assigns a display region, and issues a Start command to the assigned media player object. Some content such as text or images do not require the involvement of a media player object. The media player writes the associated URL in an appropriate fashion, such as in an image tag, into an HTML div, and causes the web page to fetch and display that content.

The presentation of the dynamic content is similar in effect to the display of video replacement ads and companion banners as illustrated in FIG. 5. Considering drawing B) Configuration for Video, the dynamic content may be presented in element 318, while the image from a DJ web cam may be presented in element 320. This combination allows a DJ or talk show host or announcer to turn on a camera so they can be seen, and show topical material as they discuss those items. These configuration changes and the appearance and removal of dynamic content take place entirely without action on the part of the audience. They just watch.

Multiple stations at the same physical location are treated similarly. The Action page 330 has TCP network access to the encoding computers 110 of the desired stations, and the command messages are delivered to each of those encoding computers simultaneously. The process for each station, having received a command message, is as described.

As stated previously, command messages can cause the media players to dynamically configure themselves for the proper presentation of the media element to be displayed. For example, display regions can be expanded or contracted, exposed or hidden, highlighted or dimmed or overlaid with translucent screening. New text and messages can be presented, and others removed. In fact, every display element on the media player can be dynamically changed upon the receipt of a command message. Referring again to FIG. 5, this illustration can be interpreted as previously described, except that drawing B) Configuration for Video now applies to the video from the DJ camera wherein the camera image is displayed in video window 320. In this embodiment, the companion banner window 318 may not be displayed, or may be used to display other dynamic content under command of the DJ using widgets 332 on the Action page 330, as will be described more fully in the context of another embodiment.

In another embodiment, media players can be substantially changed dynamically and in real-time, or according to a schedule. For example, if a radio station switches during the day from a music format to another format such as news, talk, sports, or gospel, or to a particular talk show program, or from one talk show program to another, the media players can be reformatted to reflect the character of the new program, without the users performing any actions. A schedule can be maintained by the streaming service provider that permits radio stations or talk show hosts to set dates and times, as well as formatting parameters to be used for each show. Formatting parameters might be templates. Each radio station encoding suite will obtain the schedule and associated formatting or configuration data. At the appropriate times, the encoding suite will send command messages to the media players, causing them to be reconfigured for the new show. For convenience, there are pre-written scripts in the player that respond to specific command messages in prescribed ways. But also, command messages may contain specific JavaScript, HTML, and CSS instructions to reconfigure the media player dynamically and in any arbitrary fashion. For example, any or all HTML divs could be deleted or emptied, and the body tag itself could be emptied and rebuilt via JavaScript instructions.

Multiple Stations

For arrangements of multiple stations, whether the stations are of common ownership, or a program such as a talk show is syndicated across stations of separate ownership, each station will have its own listeners, and the delay in its delay filter will be of an arbitrary value. Therefore, the command messages are delivered to each station's encoder software, to be inserted into the delay filter and sent the listeners of each station in the fashion previously described.

In order to simultaneously deliver the command messages to multiple stations there must be common TCP networking connectivity, which would not normally exist. This is achieved by a TCP Service which unites all the encoding computers together, which may be operated by the streaming media service provider, Internet hosting service, or similar service provider, although it could be operated by a syndication service.

Figure 8:
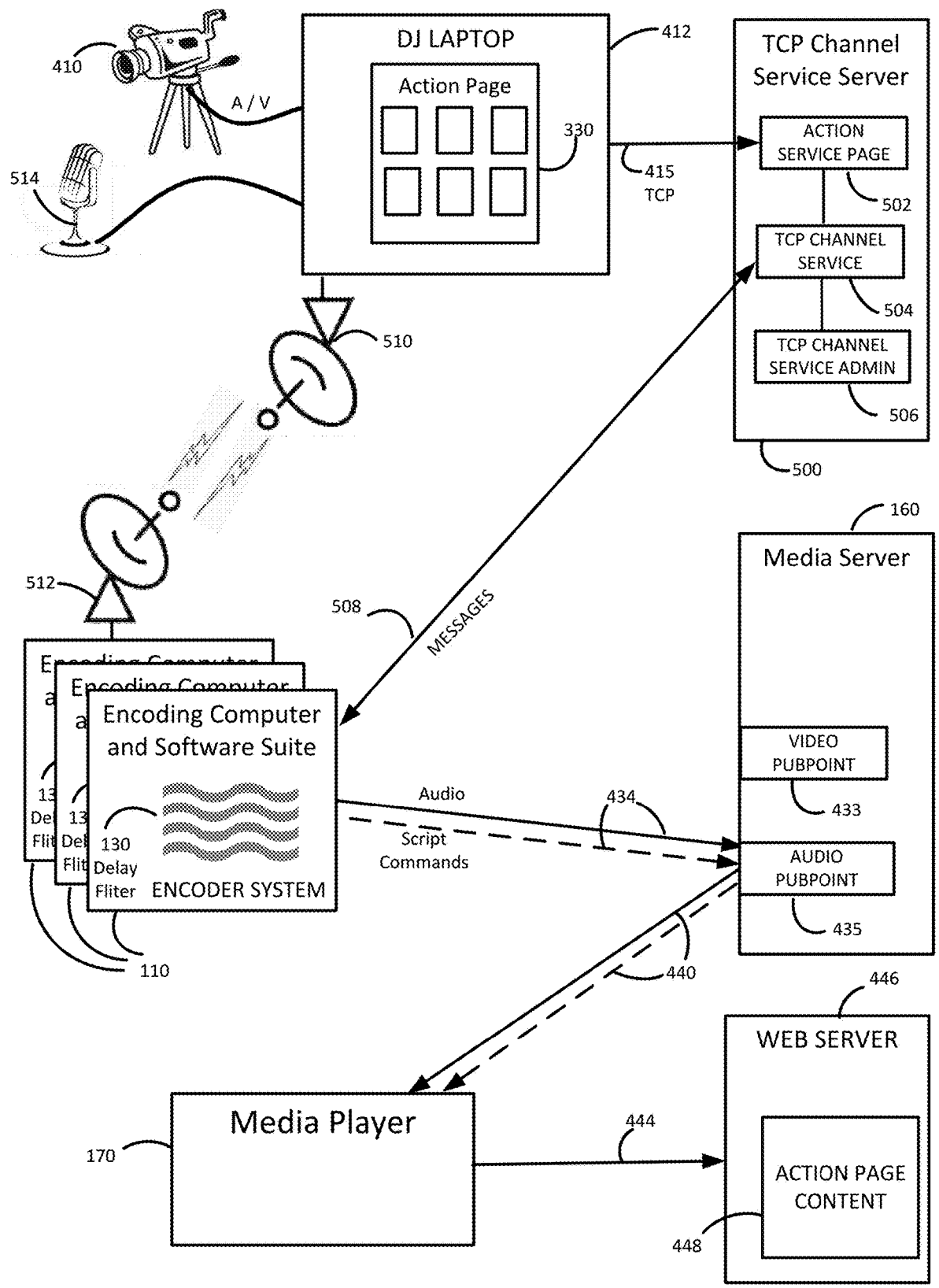
FIG. 8 is a schematic illustration of the system for Talk Show Host Dynamic Presentation of Audio/Video Content.

Referring to FIG. 8, in this embodiment there is a TCP Server 500 that operates a TCP Service 504. Each encoding computer 110 has corresponding TCP software that logs into the TCP Service via TCP Message Channel 508, and maintains an open TCP connection as long as desired. That connection may stay open permanently, and the encoding computer's TCP software may be configured to continuously re-establish the connection if the connection were broken. It is preferred that the TCP communications be originated by the encoding computers due to firewall issues, but it could be done in the reverse, wherein the TCP Service would initiate and maintain the connections.

In an alternative embodiment, each encoding computer 110 maintains a schedule of talk show and similar programs carried by the station. At the appropriate times the encoding computer initiates a connection to the TCP Service. That schedule could be maintained centrally as an administrative function, and the schedule pertinent to each station could be periodically delivered to the encoding suite, such as by Management Server 190 on FIG. 1.

Via the login process, the TCP Service has the identity of the TCP channel or socket associated with each encoding computer.

An Action service page 502 (a program, such as asp, aspx, or PHP) runs on the TCP Service server 500 or an associated server, and may be the same program that launches the talk show host Action page 330. The TCP Service 504 has an administrative module 506 that maintains login permissions, and has a listing of radio stations associated with each talk show program. When a talk show host clicks an Action button on a widget, the Action page 330 submits a request to the Action service page 502 which submits a set of parameters to the TCP Service 504, including the name of the talk show or radio station, the name of the file to be shown on the audience media players, etc., as well as the command message to be sent to the media players.

By referencing the list of talk shows and radio stations, the TCP Service determines which radio stations to deliver the command message to. It has the TCP channel (socket) 508 open for each of those radio stations, and forwards the command message to all of them at the same time.

Each station encoder 110 is unaware of other stations on this network, and acts independently, just as before. The encoding system 110 receives the command message, and A) sends out a Get script command that is delivered immediately to the audience media players by inserting the command message into the audio encoder, using the arrangements described herein, so the media players 170 can pre-fetch the content, and B) inserts the companion Start script command into the delay buffer 130. When the delay buffer timer counts down to zero, the encoding system 110 sends the Start command out to the media players 170 by inserting the Start command message into the audio encoder. The Get and Start command messages are sent from the audio encoder element of the encoder suite 110 to the media server 160 and audio publishing point 435 which is associated with the encoder suite 110 (recognizing that radio stations may utilize different streaming service providers and media servers, and will have their own publishing point even if they use the same service provider).

When media players 170 receive the Get and Start command messages they will, as described herein, assign a display region, assign a media player object if the content to be displayed so requires, configure the media player display elements for the desired presentation format, deliver the URL for the content to the assigned media player object, or otherwise cause the content to be obtained from web server 446 and Action page content repository 448, and displayed.

In this embodiment, Action messages initiated by a talk show host will cause the display of the media element associated with the Action control panel widget on the media player of every audience member of every participating radio station. The media elements will be displayed synchronously with the corresponding talk show audio, since that audio also runs through the delay filter 130 of each encoder computer 110

As a side explanation, it should be realized that syndicated programs such as talk shows have well established arrangements to deliver the host's audio to each station in the syndication network. Typically this is done through satellite connections as shown with microphone 514 and transmitter 510 at the laptop 412, and receiver 512 at the station encoder 110. But however the audio feed arrives at each station is irrelevant. For satellite distribution, the audio arrives through the satellite link, to the broadcast automation system, through the station's audio chain and out to the transmitter, all with essentially no delay. Thus, from a practical perspective, there is no difference between audio arriving from a microphone in the studio and audio arriving from outer space. The only delay that matters, for our purposes, is the delay introduced in the delay filter for purposes of ad replacement and other requirements. And thus, the arrangement just described operates as well regardless of the origin of the audio.

Further, even though a DJ or talk show host or announcer may be associated with only one station, they may be remote from the station. For these remote broadcasts, the laptop and associated Action page and web cam requires TCP network access to the encoding computer of the station, which can be achieved with conventional networking technology. However, in another embodiment, the multi-station arrangement just described applies equally well to service this arrangement of one or more presenters having remote broadcasts for a single station.

Generally, the new content is to be presented concurrently with the talk show audio, not replace it. The content, for example, might be a video clip about a news article, and the talk show host might want to talk over the audio of the video clip in order to comment on it. In this case, dependent upon the script command received by the audience media players, those players may be instructed to simultaneously render the audio from both the talk show host and the dynamic media content. As another embodiment in these circumstances, software at the encoding computer can download the dynamic content and insert it into the delay buffer, and then merge the two streams in the delay buffer into a single output stream that gets delivered to the encoder. However, there may be circumstances where the talk show host would want the audio of either the dynamic media content or the talk show host studio audio suppressed, and that capability can be provided with selector buttons on the Action page widget that cause the construction of appropriate script commands to provide the necessary instructions to the users' media players.

In still another embodiment, whereas in some embodiments dynamic media content is accessed by a media player object in the user's media player, in an alternative embodiment, media content actuated by the Action page may be accessed by a media player object incorporated into the encoder suite. Audio and video from that player object can then be inserted into the delay filter and merged with the station's audio, and the combined audio and video delivered as output to the encoder and then to the users.

Whereas much of the previous descriptions referred to dynamic media content, perhaps implying streamed audio or video, other dynamically accessed content may be static in nature, such as a photo or text file. Static content is best accessed via a web server in the conventional fashion, and the URLs or links provided to the media players to access these items would have appropriate targets to access these items correctly.

Pop-Up Web Cam for DJ or Talk Show Hosts

There are numerous contemporary examples of radio stations that put a camera in the studio in front of the DJ, and leave it on continuously. But most of the time, the DJ isn't there (they might be out selling ads), or the DJ is looking down and so the camera shows the top of his or her head. DJs don't talk much, so most of the time when the DJ is there, it's like a silent movie. Turns out to just be a bad idea.

But what would make sense is to give the DJ the ability to dynamically turn the camera on or off when the DJ has something to say. Perhaps a DJ wants to give an intro to a song, or talk about a recent local concert, or insert some personality into the show in some other ways. In a similar fashion, an announcer might like to have a camera on when he or she is giving a news, sports, weather, or traffic report.

A talk show host, however, might like to have a camera on for the duration of his show, except perhaps during the spot breaks when he may wish to walk away from the studio. If the talk show host would like a camera on full time, and all talk shows originate from the same studio at that station, and there are no interruptions from syndicated programs, then a fixed, full time studio cam might work acceptably well. The station would simply use a video publishing point instead of an audio publishing point, and the link on the station's web page would direct the audience to the video publishing point.

But this is seldom the case. In the real world, many talk show hosts broadcast from various locations rather than the station's studio, station's do carry syndicated content, and so they definitely would need to turn the camera off during those broadcasts, and even during a single three hour show, the host may need to take a break.

In an embodiment addressing this need, a radio station personality such as a DJ, an announcer, or a talk show host can click a Start button on an Action control panel web page to turn on their web cam and cause the video to open and appear in a designated window on the audience media player, and to turn off the video and close the video window when the Stop button is clicked.

The appearance of the video window will be synchronized with the station's audio so that any announcements preceding the start of the web cam will be presented to the audience immediately before the video appears, so that the presentation to the audience will be transparent of buffering delays, and the audience's experience would appear the same as that of an observer in the studio. The feature works seamlessly whether the video content is streamed to only one radio station or to many. Except where noted, this web cam embodiment uses essentially the same technology as described above.

In a single station embodiment, the arrangement is similar to that of the previously described arrangement for a DJ or talk show host to present dynamic content to the Internet audience. In this embodiment, there is an Action page which includes buttons to turn the audience display of a web cam on or off. The Action page runs on a local computer, perhaps a laptop, which has a web cam attached or which controls a web cam or video camera of some type. The Action page may include widgets, as before, for the display of dynamic content to the Internet audience. If the Action page is also to display dynamic content, it has external network access to the web server which stores the media files and metadata information.

The laptop, and hence the Action page and web cam, also has internal network access to the encoding computer, which has software to communicate with the Action page. When a Show Web Cam button on the Action page is activated, the Action page sends a Show Web Cam command message to the encoding computer and begins streaming the camera feed to the encoding computer via TCP. The encoding suite has software arrangements to receive the command messages from the Action page, and to receive and process the audio/video stream from the camera.

The camera A/V stream may be encoded by the camera, or by encoding software in the laptop, into a conventional compressed format such as MPEG4, or the stream may be delivered in uncompressed format inside a suitable packaging container such as AVI. The encoding suite software may decompress the web cam video stream, or transcode it to an alternate format, as might be necessary for compatibility with other aspects of the overall system.

The encoding suite software inserts the received web cam stream into a delay filter, which operates parallel to the delay filter used for the station's audio. Thus, the station's audio, and the web cam video are in sync. The associated command messages are inserted into the delay filter in association with the station's audio so it is available for delivery to the audience media players.

The output of the delay filter for the station's audio is directed to one encoder which sends the encoded audio stream to the main publishing point on the media distribution server—the "Listen" link on the station's web site connects to this publishing point.

The output of the web cam delay filter is directed to another encoder which sends the encoded a/v stream to another publishing point. When the Start Web Cam command message is first received by the encoder suite, it can start the video encoder and have it connect to the video publishing point, and just send a black signal (the actual video must run through the delay filter, or it will be out of sync).

When the web cam Action command messages are first received by the encoding suite, the equivalent "Get Web Cam" message is sent to the media players through the audio encoder via the mechanisms previously described. The Get Web Cam command message will include the video publishing point name or appropriate reference such as a URL or a code. And, also as described before, when the video delay filter reaches time zero for the start of the video media, the encoder suite sends the equivalent "Start Web Cam" command message to the media players. When the DJ stops the camera, a "Stop Web Cam" message is delivered to the encoding suite, and to the audio delay filter, and is sent to the media players when the delay reaches zero and the video delay filter is empty.

As previously described, when the media players receive a Get Web Cam command message they can prepare for the presentation of video by connecting to the video publishing point identified in the command message and pre-configuring the media player display presentation. Upon receipt of the Start Web Cam command message, the media players will complete any configuration changes and begin the display of the video in the desired display region. On receipt of the companion Stop Web Cam message, the media players will disconnect from the video publishing point and reset the media player configuration to a desired mode.

The particulars of this embodiment are described in reference to FIG. 7. DJ 400 has headphones 402 and microphone 404 connected to a mixer 406 which carries audio between the DJ and an automation system 422 or components of the station's audio chain. The station's audio is input into the encoder computer 110 via connection 424, and metadata from the broadcast automation system is input via connection 426. Mixer 406 may also provide a feed of either the DJ's microphone output, or of the mixed studio audio via connection 408 to the DJ laptop 412. Camera 410 also connects to laptop 412. Thus the camera may provide its own audio, and there may also be an audio feed from the studio. In either case, laptop 412 may incorporate an encoder, and that encoder may be commanded to mute or encode the audio from the camera, and to encode or not encode the station's audio. The selection of these audio feeds may be variable and may be provided to the DJ via buttons or check boxes on the Action page 330.

Using the above described connectivity, when the DJ clicks a Show Camera button on Action page 330, associated laptop 412 starts the video feed from camera 410 across TCP link 418 to the encoding computer 110 and simultaneously sends an equivalent Show Camera command message 420 via TCP link 418 to encoding computer 110. The encoding suite on encoding computer 110 inserts the video feed into the delay filter 130, and inserts a Start Camera command message into the delay filter 130 at the start of the video media data, and sends a Get Camera command message to the audio encoder for immediate delivery to media players 170 via the audio publishing point 435. When the beginning of the video exits the delay filter 130 it is input into a second encoder which outputs via connection 432 to video publishing point 433 on media server 160. Station audio and command messages are output by an audio encoder of the encoding suite via link 434 to an audio publishing point 435 on media server 160. At the same time as the beginning of the video feed is output to video publishing point 433, the Start Camera command message exits the delay filter 130 and is input into the audio encoder whereupon it is inserted into the audio feed 434 for delivery to the audio publishing point 435 of media server 160.

When a media player 170 receives a Get Camera command message via link 440 from publishing point 435 it assigns an available media player object to play the video, mutes that player, hides the player if not already hidden, delivers the URL of the video feed at publishing point 433 to the player object, and optionally starts the video playing. The video encoder may transmit a blank signal to the video publishing point until the video transits the delay filter, and if so the player object will be able to connect in advance of the time when the DJ image appears.

When a media player 170 receives a Start Camera command message via audio publishing point 435 of media server 160, the media player 170 starts the media player object that has been assigned to play the video and the video begins to play. Concurrently, the window assigned to display the video is revealed if not already visible. Simultaneously, the media player 170 may optionally mute the audio player object or the video player object, dependent upon the detailed nature of the command messages that have been received, which may be reflective of the physical arrangement of mixer 406 and audio feed 408.

Figure 9:
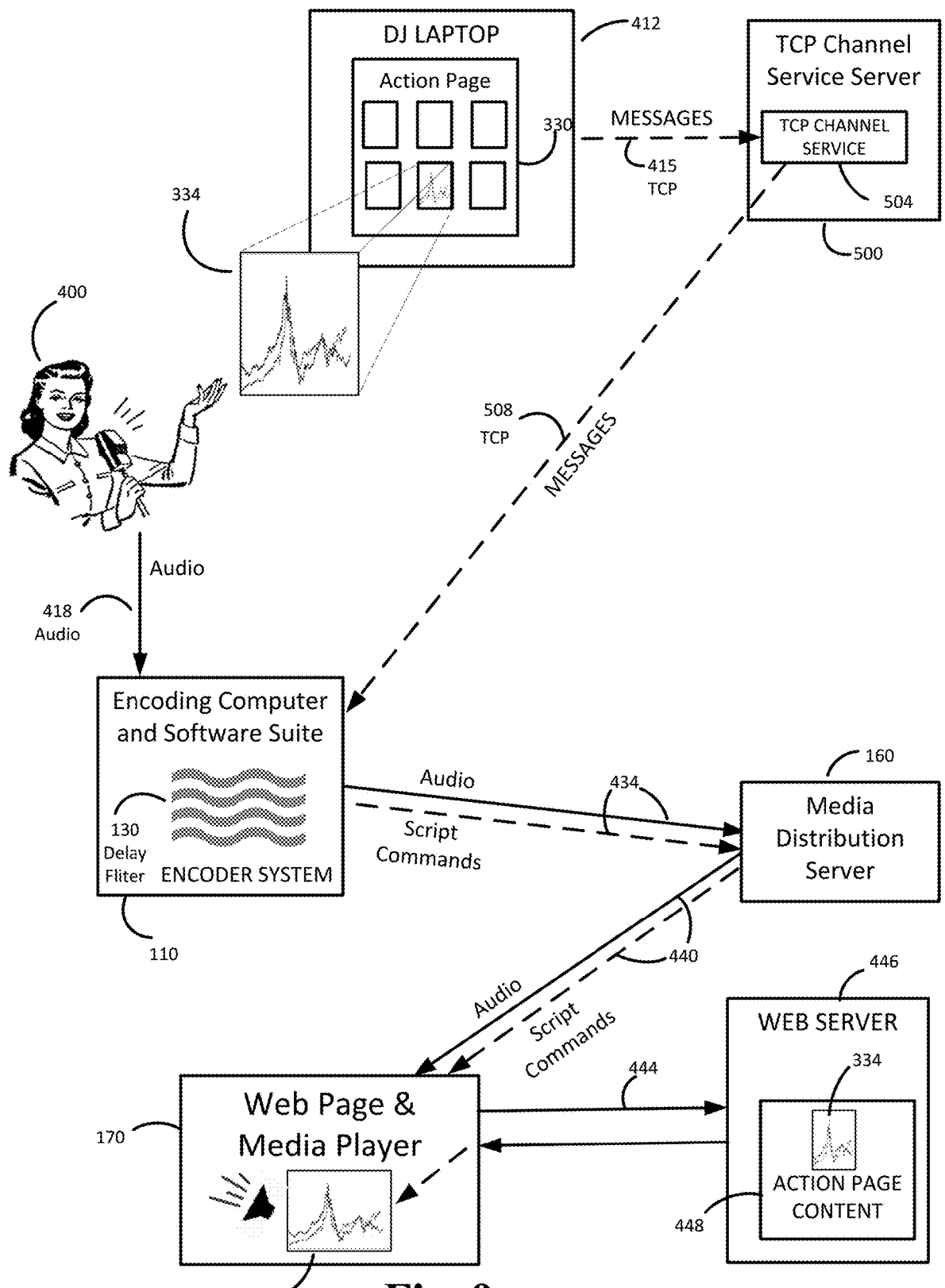
FIG. 9 is a simplification of FIG. 8, with one additional item from FIG. 6 and one additional item from FIG. 7.

FIG. 9 incorporates the DJ/Announcer 400 from FIG. 7, indicating that this person is the operator of DJ Laptop 412, which hosts the Action Page 330 as a browser web page. The Action Page 330 illustrates a "widget" containing a preset content element 334 from FIG. 6. This content element has been uploaded to web server 446 which stores the Action Page content 448. Action Page content element 334 is now shown in the context of Action Page Content 448 on Web Server 446 to indicate the relationship of this content page element to the rest of the system.

The action of the DJ/Announcer clicking on element 334 of the Action Page 330 causes the Action Page 330 to send a message via TCP channel 415 to the TCP Channel Service 504 of the TCP Channel Service Server 500. TCP Channel Service 504 relays the message via TCP channel 508 to Encoder System 110, which also receives the audio from the DJ/Announcer via connection 418.

The Encoder System converts the received message into a script command, and outputs the script command in a control channel of a composite data stream 434 on the Internet to Media Distribution Server 160, while simultaneously outputting the received audio as the media channel of the same composite data stream 434. The script commands and audio are received by Media Distribution Server 160 and relayed via the Internet to the Web Page & Media Player 170.

The script commands received by the Web Page & Media Player 170 from Media Distribution Server 160 cause software in the Web Page & Media Player 170 to fetch content element 334 from Web Server 446, and display that content element 334 to the user.

Even though a DJ or talk show host or announcer may be associated with only one station, they may be remote from the station. For these remote broadcasts, the Action page 330 requires TCP network access to the encoding computer of the station, which can be achieved with conventional networking technology.

Optionally, the system described may utilize only one encoder and one publishing point, wherein the video feed from camera 410 is inserted into the single encoder component of encoder suite 110, and is output to a single publishing point such as video publishing point 433 on media server 160, to which the media players 170 are connected.

In another embodiment, the dynamic web cam embodiment can be operated in conjunction with the dynamic presentation of content embodiment, in a synergistic fashion. For example, a DJ might turn on his camera and then talk about a radio station contest, and by clicking a button on an Action page widget, cause a window to open on the media players showing information about the contest or photos of contest winners. The two display windows (divs) can be arranged so that the relationship between the announcer and the topic and material he is presenting is intuitively obvious.

Media players that have connected after command messages have been sent will be unaware of either the availability of web cam video, or of dynamic content. To accommodate these users, the encoders responsible for sending the command messages will periodically send repeat messages, perhaps once a second. The messages will be designated as "Repeat" so that media players which have already received them will not duplicate their responses.

Web Cam for Multiple Stations

In a multi-station embodiment, audio (or video) for syndicated content carried by affiliate radio stations is delivered to each radio station via arrangements outside the interest of this patent application. That audio feed might be delivered by satellite, dedicated phone lines, or other arrangements. In whatever fashion the syndicated audio is delivered to the station, the important fact of consideration here is that multiple stations might be carrying a talk show host's program, and when the talk show host turns on his web cam, the associated video content stream needs to be delivered to the audience listening to each of the affiliated stations.

The embodiment to accomplish this uses the TCP Service described above. In a typical talk show host scenario, the host will be based in a studio in one radio station, and will have a laptop with an Action page, and a connected camera and will also have its own encoder software. The laptop and therefore the Action page will have a connection to the TCP Service. Radio stations carrying the talk show host's syndicated content will also have connectivity to the TCP Service.

When the talk show host turns on his web cam via clicking on a button on the Action page, the camera feed is connected to the local encoder which encodes the video in a suitable format and transmits the video stream to a publishing point on a media distribution server. Simultaneously, a command message is sent to the TCP Service, which relays that command message to all participating radio station encoding computers. That message includes the name, URL, or other ID of the media distribution server and video publishing point.

The command messages are delivered to each radio station's encoding software suite, which inserts them into the delay buffer for the station's audio. When the buffer time for the messages drops to zero, the command messages are forwarded to the media server that provides distribution services for that radio station, and then from the media server to the media players of users connected to the publishing point on the media server that is associated with the individual radio station. Thus, users listening to the streaming media from a particular station will receive script commands from that station. Those media players are thus instructed to connect to the supplied video publishing point, as described previously, and thus the video from a syndicated talk show will be shown on the media players of every listener of every participating station.

In an embodiment for syndicated programs to a small number of stations, the laptop of the talk show host may connect directly via TCP to the encoding computers of each station, and deliver the command messages to them directly. The video feed, as described above, will connect directly to a video publishing point on a media distribution server.

Recording the Web Cam Video

In another embodiment, the web cam video can be automatically recorded and be available for immediate playback. When the talk show host turns on his web cam, the A/V content from that web cam is directed to an encoder on a computer local to the talk show host. That encoder transmits the encoded video to a video publishing point on a media server. That publishing point is dynamically configured by a software application to create an archive file of the video stream; the archive file name may be either static or may also be dynamically configured. In the case of Microsoft's Windows Media Server, there is a feature known as the Archive Data Writer which performs these functions. Also, media players can connect to the archive file while it is being written. Management software running on a server in communication with the video streaming media server, or running in association with the encoding software at the talk show host's location, performs the dynamic configuration and assigns or creates the command messages to be sent to user media players via procedures already presented.

The command messages contain the Internet address of the video media server and the name of the archive file being written. Software in the media players then causes the presentation of a link for users to access the recorded video, even as it is being recorded.

Having thus described the invention in detail, it should be understood that various changes, substitutions, and alterations may be readily ascertainable by those skilled in the art, and may be made herein without departing from the spirit and scope of the invention as defined by the claims.

I claim:

1. A method of streaming media content on the Internet to an audience web page incorporating a media player, enabling a dynamic activation of video or visual content by causing software of the audience web page to dynamically connect to a supplemental media stream and to reconfigure the presentation layout of the audience web page to accommodate the supplemental media, and to access and play the supplemental media stream, comprising the steps of:
   a. receiving media content by a streaming encoder;
   b. encoding said received media content by the streaming encoder for presentation on an audience web page;
   c. receiving a trigger message by the streaming encoder from a system for controlling audience web pages, the trigger message identifying a supplemental media stream that the audience web page is to connect to;
   d. creating a script command by the streaming encoder in response to the trigger message, in which the script command comprises instructions specifying the supplemental media stream and audience web page reconfiguration data to reconfigure the presentation layout and to access and play the supplemental media stream;
   e. encoding the script command by the streaming encoder, in association with, and time-synchronous with, encoding the received media content, into a composite media stream; and,
   f. outputting the composite media stream by the streaming encoder to a file for delivery to an audience web page for playback of the received media content and execution of the instructions of the associated script command to reconfigure the audience web page including the presentation layout of the audience web page for presentation of the supplemental media stream, and to access and play the supplemental media stream.

2. The method as recited by claim 1, wherein the outputting of the composite media stream by the streaming encoder is to a distribution media server configured to write the received composite media stream to a file for delivery to an audience web page for playback of the received media content and execution of the instructions of the associated script command to reconfigure the presentation layout of the audience web page for presentation of the supplemental media stream, and to access and play the supplemental media stream.

3. The method as recited in claim 1, wherein the reconfiguration of the presentation layout of the audience web page for presentation of the supplemental media stream is to reveal a window for the presentation of a video.

4. The method as recited in claim 3, wherein the video is from a live camera feed.

5. The method as recited in claim 1, wherein the reconfiguration of the presentation layout of the audience web page for presentation of the supplemental media stream is to reveal a window for the presentation of an image.

6. The method as recited in claim 1, wherein the trigger message is originated by an action control panel, the action control panel being a software aspect of a computer system comprising the ability to send trigger messages to the streaming encoder in response to User Interface actions to activate desired responses on the audience web page.

7. The method as recited in claim 1, wherein the trigger message is originated by an associated system of the streaming encoder and configured to operate according to scripts or schedules for provisioning of trigger messages to the streaming encoder.

8. A system comprising a server of an Internet broadcaster streaming media content to an audience web page comprising a media player and a presentation layout, comprising:
   a. the server comprising a streaming encoder of the Internet broadcaster configured to receive Internet broadcast media content;
   b. the streaming encoder configured to encode the received Internet broadcast media content for presentation on the audience web page;
   c. the audience web page presented to a user by a web server of the Internet broadcaster and configured to play the encoded Internet broadcast media content;
   d. a system of the Internet broadcaster for controlling audience web pages configured to originate a trigger message identifying a supplemental media stream that the audience web page is to connect to, and to provide the trigger message to the streaming encoder;
   e. the streaming encoder of the Internet broadcaster configured to receive the trigger message, and, in response to the trigger message, to create a script command comprising instructions specifying the identified supplemental media stream and specifying associated audience web page reconfiguration data, including presentation layout, to accommodate the identified supplemental media stream;
   f. the streaming encoder of the Internet broadcaster configured to encode the script command, in association with, and time-synchronous with, encoding the received media content, into a composite media stream; and,
   g. the streaming encoder configured to output the composite media stream to a file for delivery to the audience web page for playback of the received media content and for execution of the instructions of the associated script command to reconfigure the audience web page presentation layout for presentation of the identified supplemental media stream, and to access and play the identified supplemental media stream.

9. The system as recited by claim 8, wherein the streaming encoder is configured to output the composite media stream to a distribution media server configured to write the received composite media stream to a file for delivery to an audience web page for playback of the received media content and execution of the instructions of the associated script command to reconfigure the layout of the audience web page for presentation of the supplemental media stream, and to access and play the supplemental media stream.

10. The system as recited in claim 8, wherein the reconfiguration of the layout of the audience web page for presentation of the supplemental media stream is to reveal a window for the presentation of a video.

11. The system as recited in claim 10, wherein the video is from a live camera feed.

12. The system as recited in claim 8, wherein the reconfiguration of the layout of the audience web page for presentation of the supplemental media stream is to reveal a window for the presentation of an image.

13. The system of claim 8 of the Internet broadcaster for controlling audience web pages is an action control panel, the action control panel being a software aspect of a computer system comprising the ability to send trigger messages to the streaming encoder in response to User Interface actions to activate desired responses on the audience web page.

14. The system of claim 8 of the Internet broadcaster for controlling audience web pages is an associated system of the Internet broadcaster configured to operate according to scripts or schedules for provisioning of trigger messages to the streaming encoder.

15. A non-transitory machine-readable medium, wherein medium is not a signal, containing processor readable code for programming a processor of a computing system of an Internet broadcaster streaming media content on the Internet, comprising:
 a. computer programming instructions to operate a streaming encoder of the Internet broadcaster configured to receive Internet broadcast media content;
 b. computer programming instructions to operate the streaming encoder to encode the received Internet broadcast media content for presentation on an audience web page comprising a media player and a presentation layout;
 c. computer programming instructions to receive a trigger message from a source of the broadcaster for controlling audience web pages, the trigger message identifying a supplemental media stream that the audience web page is to connect to;
 d. computer programming instructions to create a script command in response to the trigger message which specifies the supplemental media stream and audience web page reconfiguration data to accommodate the supplemental media stream;
 e. computer programming instructions to encode the script command, in association with, and time-synchronous with, encoding the received Internet broadcast media content, into a composite media stream; and,
 f. computer programming instructions to output the composite media stream to a file for delivery to an audience web page for playback of the received media content and execution of the instructions of the associated script command to reconfigure the layout of the audience web page for presentation of the supplemental media stream, and to access and play the supplemental media stream.

16. The non-transitory machine-readable readable medium of claim 15 comprising computer programming instructions provide for outputting the composite media stream to a distribution media server configured to write the received composite media stream to a file for delivery to an audience web page for playback of the received Internet broadcast media content and execution of the instructions of the associated script command to reconfigure the presentation layout of the audience web page for presentation of the supplemental media stream, and to access and play the supplemental media stream.

17. The non-transitory machine-readable readable medium of claim 15 wherein the received trigger message originates from a web page action control panel hosted by a web server of the broadcaster.

18. The non-transitory machine-readable readable medium of claim 15 wherein the reconfiguration of the presentation layout of the audience web page for presentation of the supplemental media stream is to reveal a window for the presentation of a video.

19. The non-transitory machine-readable readable medium of claim 18 wherein the video is from a live camera feed.

20. The non-transitory machine-readable readable medium of claim 15 wherein the reconfiguration of the presentation layout of the audience web page for presentation of the supplemental media stream is to reveal a window for the presentation of an image.

* * * * *